Patented July 23, 1940

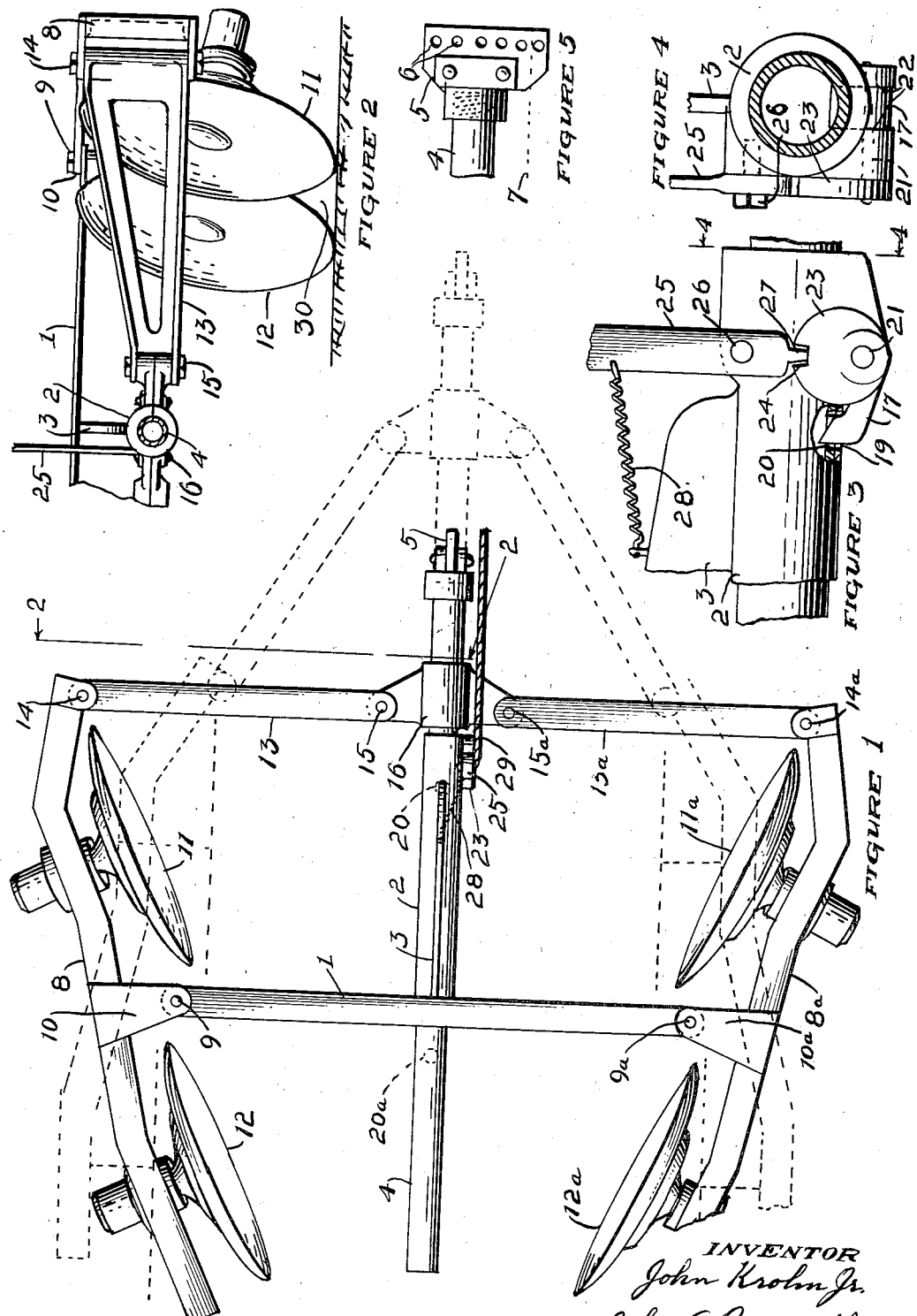

2,208,677

UNITED STATES PATENT OFFICE 2,208,677

RIDGER

John Krohn, Jr., near San Martin, Calif.

Application June 13, 1939, Serial No. 278,888

1 Claim. (Cl. 97—56)

The present invention relates particularly to a machine for throwing up ridges to form reservoirs whereby water may be retained over a section of ground sufficiently long to thoroughly soak and irrigate the same.

In the irrigation of orchards it is customary to form a rectangular basin about each tree, or an irregularly formed basin embracing a number of trees when the contour system of irrigation is used, and then flow water into each basin in succession. In forming these basins it is necessary to throw up ridges of land to form the side walls thereof, but as heretofore formed these ridges are more or less porous and require constant attention to prevent the water in one basin breaking through the side walls and prematurely passing on to another basin.

It is one object of the present invention to provide a ridger that will satisfactorily overcome the aforementioned difficulty by properly compacting the soil in the ridge as it is formed.

It is another object to provide a ridger that is so constructed and arranged that the ridge forming discs can be quickly and easily adjusted to an inoperative position whereby the device may be drawn over roads or soil of any kind without materially affecting the surface thereof and without the use of wheels or skids or other supporting means.

It is also an object of the invention to provide a machine of the character indicated that will be simple in form and construction, economical to manufacture, that consists of few parts, and that will be strong, durable, and highly efficient in its practical application.

These and other objects may be attained by means of the construction illustrated in the accompanying drawing, in which—

Figure 1 is a plan view of a machine embodying my invention, a part being broken away.

Figure 2 is a partial front end view taken on line 2—2 of Figure 1.

Figure 3 is an enlarged side elevation of the draft pole adjusting means, parts being broken away.

Figure 4 is a view on line 4—4 of Figure 3.

Figure 5 is a side elevation of the end portion of the draft pole showing the hitch mounted thereon.

In the particular form of the device herein disclosed I show at 1 a transverse beam on which is rigidly and centrally mounted a forwardly extending tubular member as 2, a bracing web being indicated at 3.

Slidably mounted in the tube 2 is a second tubular member 4 having the hitch 5 mounted on its front end. The orifices in the member 5 by means of which the draft vehicle, not shown, is connected thereto are shown at 6, this vertical row of orifices extending below the horizontal level of the disc centers indicated by the dotted line 7, whereby the connection to the draft vehicle may be maintained in close proximity to the ground, and the power of the vehicle most effectively applied.

Since the structure is identical on both sides of its longitudinal axis, that structure on one side will be described in detail and the corresponding parts on the opposite side will be indicated by similar reference numerals followed by the character a.

At 8 is shown a side bar mounted for pivotal adjustment about a vertical axis at 9 on the adjacent end of beam 1 through the medium of brackets 10, and on the bar 8 are mounted rotatable discs as 11 and 12, one forwardly of axis 9 and the other rearwardly thereof.

At 13 is shown a link pivotally connected at 14 to the forward end of bar 8, and also pivotally connected as at 15 to a collar 16 rigidly mounted on the member 4.

At 17 is a catch pivotally mounted on the under side of member 2 to pass through a hole 19 formed in the under side of said member and engage a hole 20 in the forward part of the under side of member 4, or 20a in a rearward part thereof as the case may be. When the catch 17 engages hole 20 the parts are in the position shown in solid lines, in Figure 1, but when it is disengaged therefrom and placed in engagement with hole 20a, then the parts assume the positions shown in dotted lines.

The catch 17 is secured to a pin 21 which rotates in bearings 22 on member 2 and is actuated by means of a disc 23 fixedly mounted on pin 21 in eccentric relation thereto and having a notch 24 formed in the upper edge thereof. A lever 25 is pivotally mounted on the member 4 at 26 and is provided with a finger 27 engaging notch 24. The lever is connected to the web 3 by means of a tension spring 28, and is fitted with a pull-cable 29 for the purpose hereinafter described.

When the device is not required to do any work the member 4 is pulled forwardly in member 2 until the catch 17 engages the hole 20a in member 4, this adjustment swinging the discs 11—12 into parallel relationship with the draft line of the device through the medium of the link 13 and cooperating parts. In this position, shown in dotted lines in Figure 1, the discs are offset with relation to their direction of movement and function merely as wheels carrying the superimposed structure, rolling freely over the surface of the ground.

When it is desired to start the ridging operation it is only necessary to push the member 4 backwardly through the member 2 by reversing the movement of the tractor, the catch 17 automatically disengaging itself from hole 20a and automatically engaging hole 20. In this adjustment the discs are forced into the angular working position shown in solid lines and securely held in that position.

In this working position it will be noted that the disc 11, due to its angular position relative to both horizontal and vertical planes, will engage the soil and throw it inwardly toward the draft line of the device in a manner commonly known in the art. But the disc 12 is mounted to follow disc 11 in certain definite offset relation thereto, its forward edge being substantially aligned with the center of the face of the disc 11, or approaching that point so closely that the space between said discs when viewed in front elevation is very small as clearly shown at 30 in Figure 2. By positioning the two discs in this manner I have found that the disc 12 will not only pick up a strip of soil not engaged by disc 11, but will receive all of the soil thrown inwardly by disc 11 and force the one to intermingle with the other, compacting the whole into a ridge that is impervious to water. In performing this work the bar 8 functions as a nearly balanced lever, the working disc 11 tending to swing the rear end of the bar inwardly, and the working disc 12 tending to swing the rear end of the bar outwardly. But since the rear disc 12 performs the greater amount of work in compacting and is spaced from the axis 9 a distance substantially equal to the spacing of disc 11 therefrom the link 13 is placed under compression and functions as a strut, the pulling power being applied entirely through the medium of the beam 1. By applying the power in this manner extreme simplicity of construction and great strength and durability is achieved.

Furthermore, by means of the construction described the top level of the device is lowered to the top edges of the several discs, allowing it to be drawn freely under the lower branches of the trees, and the side bars are so formed that it can be operated close to the tree trunks without danger of injury thereto.

To again place the discs in an inoperative position it is only necessary for the operator of the tractor to release the catch 17 by pulling on cable 29, the forward movement of the tractor resetting the several parts as described.

Again, the structure described is such that the tractor is hitched closely to the working discs, making it possible to make short turns around a tree without difficulty.

Although certain specific embodiments of the invention have been herein illustrated and described, it will be understood that various alterations in the details of construction and mode of assembly may be made without departing from the scope of the invention as indicated in the appended claim.

I claim:

A ridger comprising, a draft frame, a bar pivotally mounted on each side thereof for lateral swinging movement into and out of parallel relation with the draft line of the frame, a pair of plow discs mounted on each bar to turn the earth inwardly, and instrumentalities associated with the frame and connected to the said bars operative to simultaneously move the said bars into parallel relationship with the draft line of the frame or into forwardly diverging angular relationship relative thereto, the rear edge of the forward disc and the central portion of the working face of the rear disc on each bar being aligned in a substantially vertical plane parallel to the draft line of the frame when said bars are in the last named position whereby the earth turned inwardly by the forward disc will be added to and compacted by the rear disc.

JOHN KROHN, Jr.